United States Patent [19]

Inque et al.

[11] Patent Number: 5,749,330
[45] Date of Patent: May 12, 1998

[54] COOLING SYSTEM FOR AN INTERNAL COMBUSTION ENGINE

[75] Inventors: Yoshimitsu Inque, Toyoake; Yasutoshi Yamanaka, Kariya; Ryuichi Matsushiro, deceased, late of Okazaki, by Kunie Matsushiro, legal representative; Hikaru Sugi, Nagoya; Takayuki Hayashi, Aichi-gun; Tatsuo Sugimoto, Ooba; Koichi Ito, Kariya; Hiroyuki Fukunaga, Okazaki; Tokio Kohama, Nishio; Toshihiko Igashira, Toyokawa, all of Japan

[73] Assignees: Nippondenso Co., Ltd., Kariya; Nippon Soken, Inc., Nishio, both of Japan

[21] Appl. No.: 607,349

[22] Filed: Feb. 26, 1996

[30] Foreign Application Priority Data

Feb. 24, 1995 [JP] Japan ................ 7-061834
Jun. 28, 1995 [JP] Japan ................ 7-162162

[51] Int. Cl.⁶ .................................... F01P 7/14
[52] U.S. Cl. ........................ 123/41.1; 123/41.14
[58] Field of Search ............ 123/41.05, 41.06, 123/41.1, 41.14

[56] References Cited

U.S. PATENT DOCUMENTS 3,498,539 3/1970 Boehmteld et al. ............ 123/41.14
4,556,171 12/1985 Fukami et al. ................ 123/41.14

FOREIGN PATENT DOCUMENTS 2-120119 5/1990 Japan.
6-278449 10/1994 Japan.

*Primary Examiner*—Noah P. Kamen
*Attorney, Agent, or Firm*—Cushman, Darby & Cushman IP Group of Pillsbury Cushman, Darby & Cushman

[57] ABSTRACT

By using a small heat accumulator installed in a cooling water system, malfunction of exhaust emission during warming up is prevented. Such a cooling system includes a cooling water passage for returning cooling water flowing from a cooling water outlet of an automotive engine to a cooling water inlet through a radiator, a first bypass passage for returning the cooling water just after flowing from the cooling water outlet to the cooling water inlet through the radiator, a second bypass passage for returning the cooling water just after flowing out from the cooling water outlet of the engine to the cooling water inlet through the radiator by supplying the cooling water near a heat-sensing portion of a thermostat, a flowing amount adjusting valve for enlarging a cooling water flowing ratio to the first bypass passage with respect to the second bypass passage corresponding to a reduction of a load of the engine and the heat accumulator installed through the first bypass passage.

26 Claims, 11 Drawing Sheets

FIG. 18A
FIG. 18B
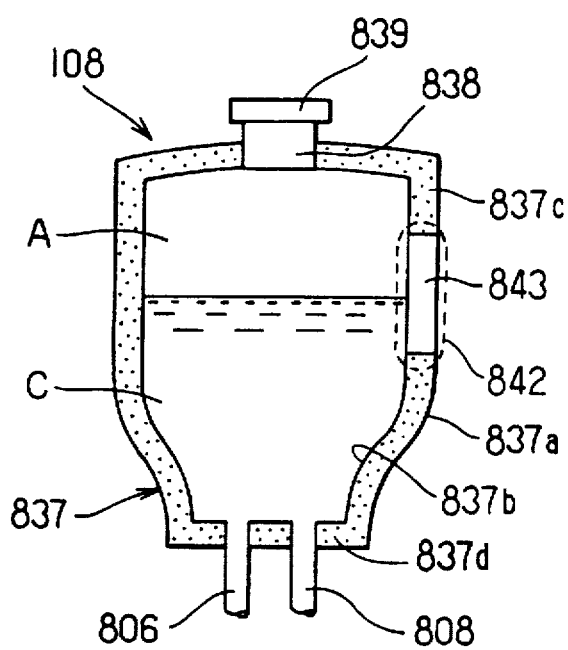
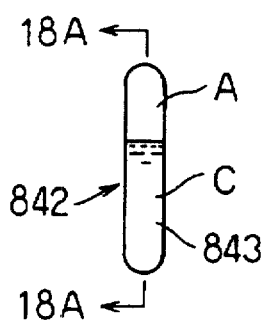
FIG. 19
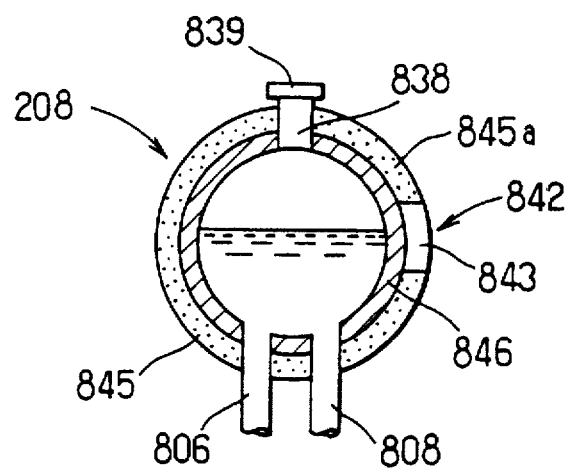

COOLING SYSTEM FOR AN INTERNAL COMBUSTION ENGINE

CROSS-REFERENCE TO RELATED APPLICATIONS

This application is based on and claims priority of Japanese Patent Applications No. 7-61834 filed Feb. 24, 1995 and No. 7-162162 filed Jun. 28, 1995 and is related to Japanese Patent Application No. 6-266576 filed Oct. 31, 1994, the contents of each of which are incorporated herein by reference.

BACKGROUND OF THE INVENTION

1. Field of the Invention

The present invention relates to a cooling system for an internal combustion engine and to a cooling system in which exhaust emission characteristics are improved to allow a rapid rise in temperature of cooling water at warm-up.

2. Description of Related Art

To cool an internal combustion engine, high-temperature cooling water (e.g., over 100° C.) inside the engine's water jacket is conveyed to the engine's radiator, heat from the cooling water is radiated to the atmosphere via the radiator, and water at a temperature suitable for cooling the engine (e.g., at 80° C.~88° C.) is returned thereto. At warm-up, since temperature of the cooling water is reduced so that it is at the same temperature as the atmosphere and the engine's cylinder walls are cooled down, the engine's air fuel ratio becomes rich and the engine starts reliably and runs smoothly during warm-up. However, making the air fuel ratio rich reduces the quality of the exhaust emission characteristics and fuel efficiency is reduced; therefore, the engine cannot satisfy emission standards and gasoline efficiency criteria.

Cooling water at a suitable temperature while the engine of a vehicle is running may be accumulated in a heat accumulator. When the engine is warmed up, the cooling water is used for heating up the engine cylinders rapidly to a suitable temperature, thereby preventing the occurrence of a rich air fuel ratio. However, providing a heat accumulator having a large capacity consumes precious installation space in the vehicle's engine compartment, and the engine's fuel efficiency is reduced by the increased heat capacity of the heat accumulator.

SUMMARY OF THE INVENTION

In view of the foregoing problems, a primary object of the present invention is to provide a cooling system for an internal combustion engine in which reduction in the quality of exhaust emission characteristics at warm-up is prevented by providing a small heat accumulator in the engine's cooling water system.

A cooling system for an internal combustion engine according to a first aspect of the present invention includes a cooling water passage for returning cooling water flowing from a cooling water outlet of the internal combustion engine to a cooling water inlet of the internal combustion engine through a radiator. It also includes a bypass passage for directly returning the cooling water just after flowing from the cooling water outlet of the internal combustion engine to the cooling water inlet of the internal combustion engine. The cooling system also includes a load detection device for detecting the load on the internal combustion engine, an opening and closing valve for opening the bypass passage corresponding to a reduction in the load on the internal combustion engine detected by the load detection device and a heat accumulator connected to the bypass passage.

A cooling system for an internal combustion engine according to another aspect of the invention includes a cooling water passage for returning cooling water flowing from a cooling water outlet of the internal combustion engine to a cooling water inlet of the internal combustion engine. It also includes a first bypass passage for returning the cooling water just after it flows from the cooling water outlet of the internal combustion engine to the cooling water inlet of the internal combustion engine by detouring through a radiator.

The cooling system also includes a second bypass passage for returning the cooling water just after it flows from the cooling water outlet of the internal combustion engine to the cooling water inlet of the internal combustion engine through the cooling water passage. This is done by supplying the cooling water in a vicinity of a heat-sensing valve in the cooling water passage connecting an outlet of the radiator and the internal combustion engine. Here, the heat-sensing valve opens responsive to a predetermined temperature of the cooling water. The cooling system also includes a load detection device for detecting the load on the internal combustion engine; an adjusting valve for enlarging the ratio of the amount of cooling water flowing to the first bypass passage to the amount of cooling water flowing to the second bypass passage corresponding to a reduction in the load on the internal combustion engine; and a heat accumulator in the first bypass passage.

In the above-described cooling systems, the detecting device may include a pressure chamber driving an operating diaphragm of the valve by introducing negative pressure from an intake manifold of the internal combustion engine.

In a system according to the first aspect, since the load on the internal combustion engine during warm-up is small, the valve opens and the cooling water flowing out from the cooling water outlet of the internal combustion engine flows in the bypass passage. The high-temperature cooling water accumulated in the heat accumulator flows to the cooling water inlet of the internal combustion engine due to the flow of new cooling water, and the temperature of the cylinder walls of the internal combustion engine is raised rapidly.

The cooling water flowing out from the internal combustion engine gradually raises the temperature during warm-up, and the temperature of the cooling water just after it flows out from the cooling water outlet becomes sufficiently high. The high-temperature cooling water flows in the heat accumulator in the bypass passage and is accumulated in the heat accumulator. Cooling water at a sufficiently high temperature is accumulated, and even though the heat accumulator's size is reduced, there is enough heat energy to rapidly raise the temperature of cylinder walls in the internal combustion engine during warm-up. Due to the rapid rise in the temperature of the cylinder walls, the air-fuel ratio does not have to be rich during warm-up, thus providing an improvement in the exhaust emission characteristics and an increase in fuel efficiency.

In a system according to the second aspect of the invention, when a vehicle travels with its engine at low load during warm-up, the amount of cooling water flowing to the first bypass passage is adjusted to be greater than the amount of cooling water flowing to the second bypass passage by the adjusting valve. The high-temperature cooling water flowing out from the cooling water outlet of the internal combustion engine flows in the first bypass passage and is accumulated in the heat accumulator.

At the same time, since supply of the high-temperature cooling water near the heat-sensing valve in the coolant circuit is reduced, it is almost closed. Further, the amount of the cooling water flowing through the radiator decreases and the temperature of the overall cooling water in the internal combustion engine rises. Therefore, in addition to the improvement of the exhaust emission characteristics at warm-up, this aspect of the invention also provides smoothness of the engine operation under low load conditions due to reduction of a quenching area and a reduction in fuel consumption. During high load travel, since the amount of cooling water flowing to the second bypass passage increases, supply of the high-temperature cooling water near the heat sensing portion increases and the heat sensing valve is almost open. Therefore, the amount of the cooling water flowing through the radiator increases and the temperature of the overall cooling water in the internal combustion engine falls, thereby preventing engine knock and increasing the output of the internal combustion engine.

In this way, negative load state on the internal combustion engine is accurately detected by the intake manifold negative pressure in the internal combustion engine, and the device structure is simplified because an electrical valve control circuit is not needed.

BRIEF DESCRIPTION OF THE DRAWINGS

Additional objects and advantages of the present invention will be more readily apparent from the following detailed description of preferred embodiments thereof when taken together with the accompanying drawings in which:

FIG. 18A is a cross-sectional view showing a heat accumulating-type reserve tank used in the cooling system of an internal combustion engine according to an eighth embodiment of the present invention;

FIG. 18B is an enlarged side view of a portion of the tank shown in FIG. 18A; and FIG. 19 is a cross-sectional view showing a heat accumulating-type reserve tank used in the cooling system of an internal combustion engine according to a ninth embodiment of the present invention.

DETAILED DESCRIPTION OF THE PRESENTLY PREFERRED EXEMPLARY EMBODIMENTS

Preferred embodiments of the present invention are now described with reference to the accompanying drawings.

Figure 1:
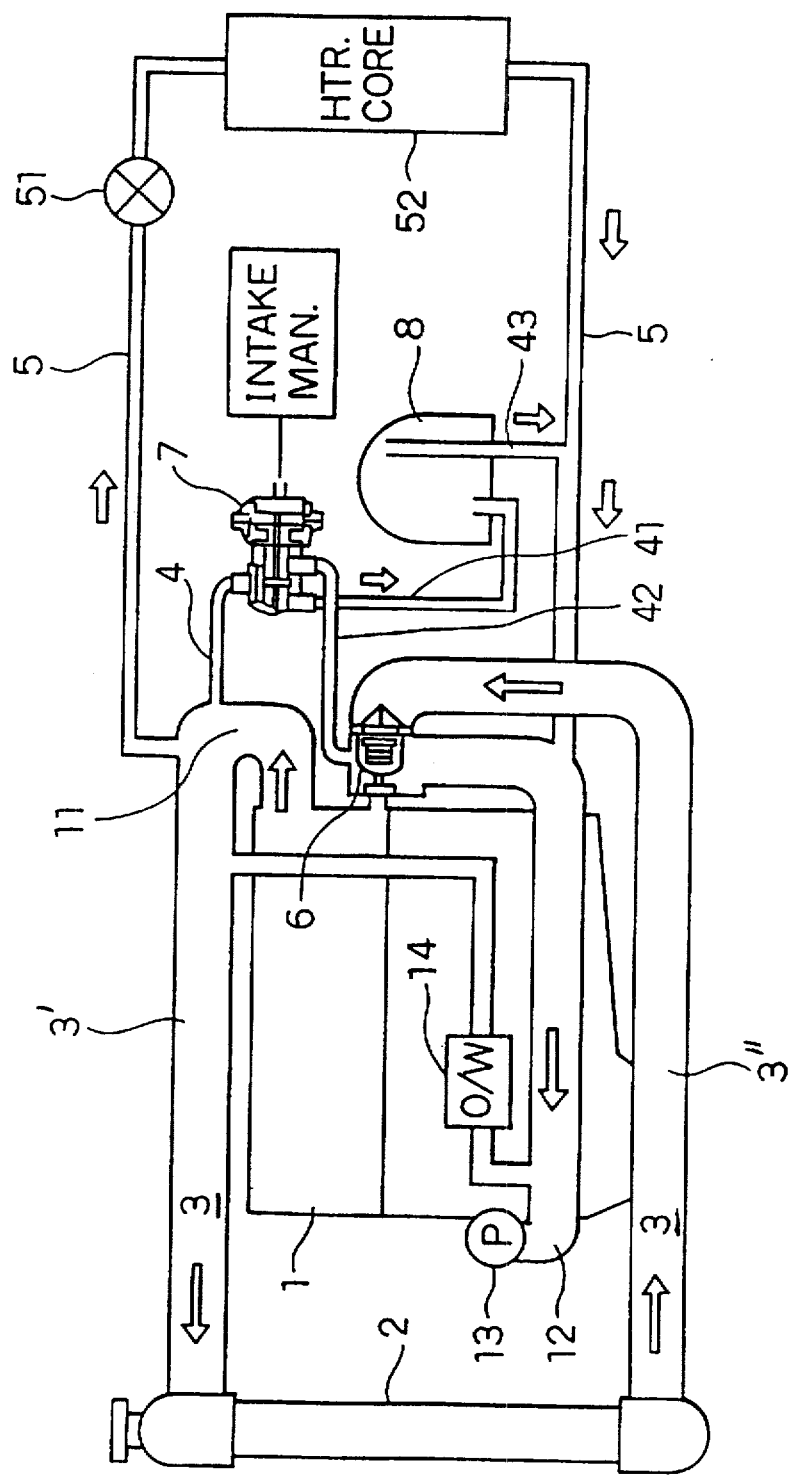
FIG. 1 shows the piping of a cooling system according to a first embodiment of the present invention.

FIG. 1 shows piping in a cooling system of an internal combustion engine according to a first embodiment of the present invention. A cooling water passage 3 (including a first passage 3' and a second passage 3") extending from a cooling water outlet 11 of an engine 1 reaches a radiator 2, passes through the radiator 2 and is connected to a cooling water inlet 12 of the engine 1. A thermostat 6 employed as a heat sensing valve is in the cooling water passage 3 reaching the cooling water inlet 12 from the radiator 2. When the temperature of the cooling water is raised by expansion of wax at the heat sensing portion of the thermostat 6, the thermostat 6 opens almost completely and increases an amount of the cooling water flowing in the cooling water passage 3. This water passes through the radiator 2 and the temperature of the overall engine cooling water decreases. When the temperature of the cooling water decreases, the thermostat 6 almost completely closes. As a result, the amount of cooling water flowing in the cooling water passage 3 which passes through the radiator 2 falls, and the temperature of the overall engine cooling water rises. Thus, the temperature of the cooling water supplied to the engine 1 stays uniform at 80° C.~88° C. A water pump 13 on the engine 1 circulates the cooling water, and the cooling water reaching the cooling water inlet 12 passes through a water jacket inside the engine 1, cools the engine 1 down and is supplied to an oil warmer 14 to warm up the engine's oil.

A main bypass passage 4 branches off from the cooling water outlet 11 of the engine 1 and reaches the adjusting valve 7. Further, bypass passages 41 and 42 extend from the adjusting valve 7. The bypass passage 41 is connected to the bottom wall of a heat accumulator 8 and opens therein, while the bypass passage 42 is connected to the cooling water passage 3 and opens near the heat sensing portion of the thermostat 6.

A warm water supplying passage 5 branches off from the cooling water outlet 11 and reaches a heater core 52 through a heater valve 51. The warm water supplying passage 5 returning from the heater core 52 is connected to the middle of the cooling water passage 3 reaching the cooling water inlet 12 and a bypass passage 43 extending from the heat accumulator 8 is connected to the above-described returning warm water supplying passage 5. The bypass passage 43 has a base end positioned at an upper inside portion of the heat accumulator 8.

Figure 2:
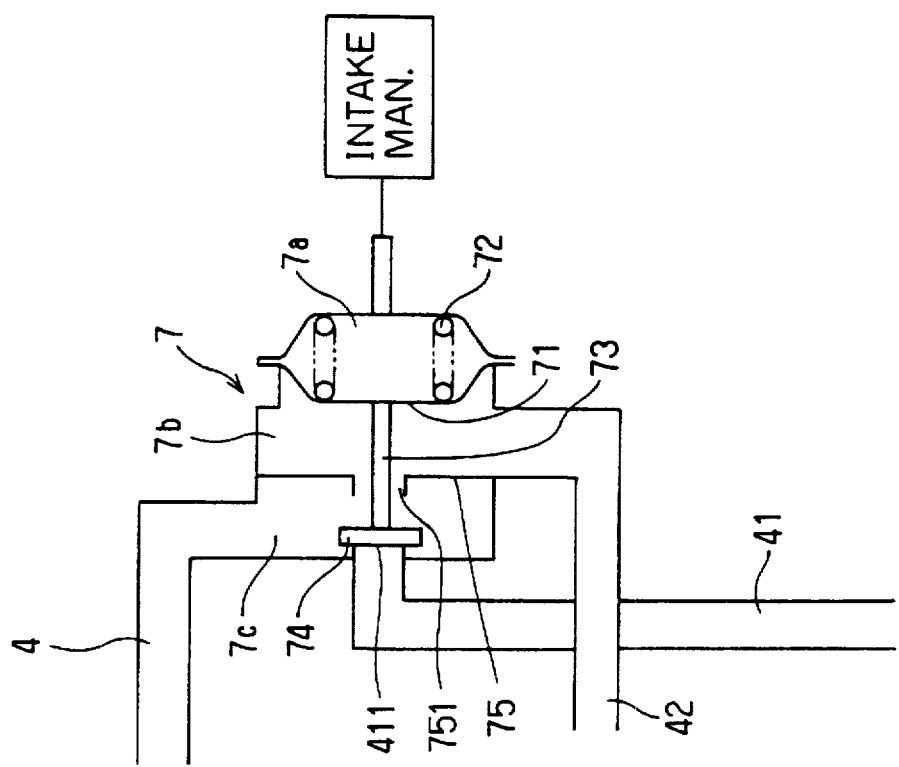
FIG. 2 is a cross-sectional view showing an adjusting valve in the embodiment.

FIG. 2 shows details of the adjusting valve 7. The adjusting valve 7 is partitioned with a diaphragm 71 to form pressure chamber 7a. The diaphragm 71 is pressed toward the left in FIG. 2 by a coil spring 72 in the pressure chamber 7a. An operating pole 73 extending from the diaphragm 71 penetrates an opening 751 of a partition wall 75 partitioning fluid chambers 7b and 7c. A valve body 74 at a tip end of the operating pole 73 closes an opening 411 of the bypass passage 41 to the fluid chamber 7c. The main bypass passage 4 communicates with the fluid chamber 7c from an upper portion of the fluid chamber 7c. The bypass passage 42 extends from the fluid chamber 7b. The pressure chamber 7a communicates with an intake manifold of the engine 1 via a manifold passage and at high loads where negative pressure of the intake manifold is low as shown in FIG. 2, the main bypass passage 4 communicates with the bypass passage 42 and the cooling water flows therein. When the engine load becomes small and negative pressure of the intake manifold increases corresponding to the reduction of the engine load, the diaphragm 71 moves toward the right, the valve body 74 gradually moves away from the opening 411 and the cooling water starts to flow from the main bypass passage 4 to the bypass passage 41. Therefore, the amount of cooling water flowing to the bypass passage 42 falls. During warm-up in which the engine load is relatively small, the valve body 74 closes the opening 751, and all the cooling water flowing from the main bypass passage 4 flows in the bypass passage 41.

When the engine is warmed up and the vehicle travels under low load conditions, a large amount of cooling water flowing from the cooling water outlet 11 of the engine 1 flows from the main bypass passage 4 to the bypass passage 41 and is supplied to the heat accumulator 8. The supplied cooling water pushes the high-temperature cooling water at the top portion of the heat accumulator 8 into the bypass passage 43 due to natural circulation. The high-temperature cooling water reaches the cooling water inlet 12 of the engine 1 through the cooling water passage 3 from the returning warm water supplying passage 5 and is supplied to the water jacket inside the engine 1 and the oil warmer 14. The temperature of the cylinder wall of the engine 1 rapidly increases due to the high-temperature cooling water, thereby improving exhaust emission characteristics because the engine air-fuel ratio need not be rich at warm-up. While traveling under a low load condition, the quenching area is reduced; therefore, the engine can run smoothly at low speed. Cooling water at a sufficiently high temperature (e.g., over 100° C.) just after flowing from the engine 1 is accumulated in the heat accumulator 8. Therefore, compared with the case where cooling water at a temperature of 80° C. to 88° C. after passing through the radiator is accumulated, even though the capacity of the heat accumulator 8 becomes 13.6% to 25% smaller, sufficient heat energy for raising the engine temperature can be accumulated.

According to this embodiment, by supplying the high-temperature cooling water to the oil warmer 14, the temperature of the oil rises rapidly (especially at warm-up), its viscosity falls and fuel consumption is reduced. The high-temperature cooling water is supplied to the heater core 52 and warm-up operation improves.

When the engine 1 is under a heavy load, the cooling water just after flowing from the cooling water outlet 11 starts flowing to the bypass passage 42 from the main bypass passage 4 and the high-temperature cooling water is supplied near the thermostat 6; therefore, it opens slightly. As a result, the amount of the cooling water passing through the radiator 2 increases and the overall temperature of the engine cooling water falls from the temperature range of 80° C. to 88° C. Engine knocking is prevented and filling efficiency is improved; therefore, the engine output can be increased.

When the engine 1 changes state from the high load state to the low load state while traveling, the cooling water just after flowing from the cooling water outlet 11 starts flowing to the bypass passage 41 from the main bypass passage 4, and therefore, the high-temperature cooling water inside the heat accumulator 8 is pushed out and supplied to the engine 1. Thus, the high-temperature cooling water is supplied to the engine 1 under the low load state and thin burning in the engine 1 starts so that the fuel efficiency is improved.

Figure 3A:
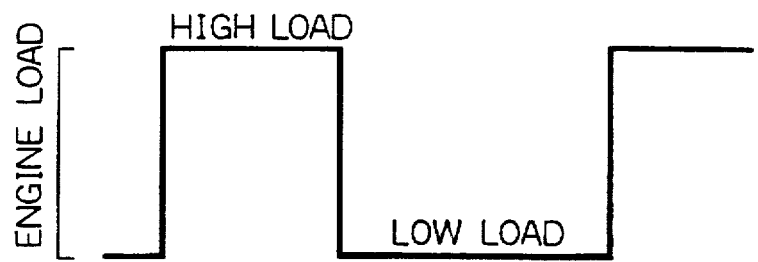
FIGS. 3A and 3B are graphs showing operation of the cooling system.
Figure 3B:
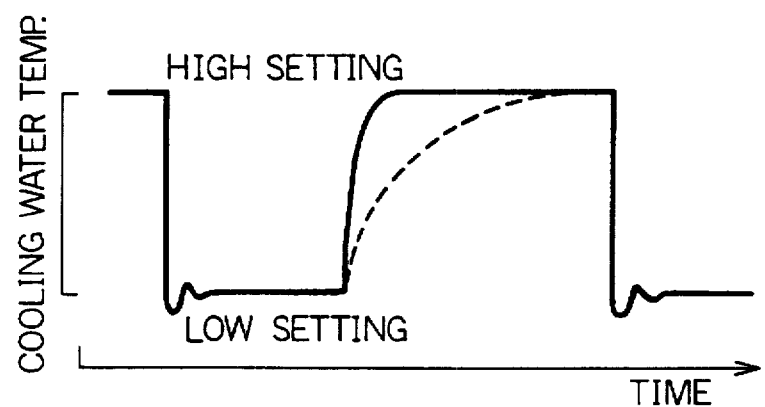

FIGS. 3A and 3B show changes between the engine load and the temperature of the cooling water. In FIG. 3B, a solid line denotes the present embodiment and a dotted line denotes a prior art system without the heat accumulator 8. In the present embodiment, raising the water temperature when the engine is changed to the low load state can be carried out rapidly.

In the present embodiment, the adjusting valve 7, the thermostat 6, the heat accumulator 8, the bypass passages 4, 41, 42 and 43 can be integrated as a unitary module.

When the temperature of the cooling water does not have to be reduced in the engine high load state, the bypass passage 42 need not be provided and in addition to the adjusting valve 7, a valve for opening and closing corresponding to the intake manifold negative pressure can be used.

Although the load state of the engine 1 is detected using the intake manifold negative pressure, the load state can be detected using another method. In this case, in addition to the adjusting valve 7 or the opening and closing valve of the negative pressure operating type, an electromagnetic valve operated by an electrical signal from a control circuit can be used.

Figure 4:
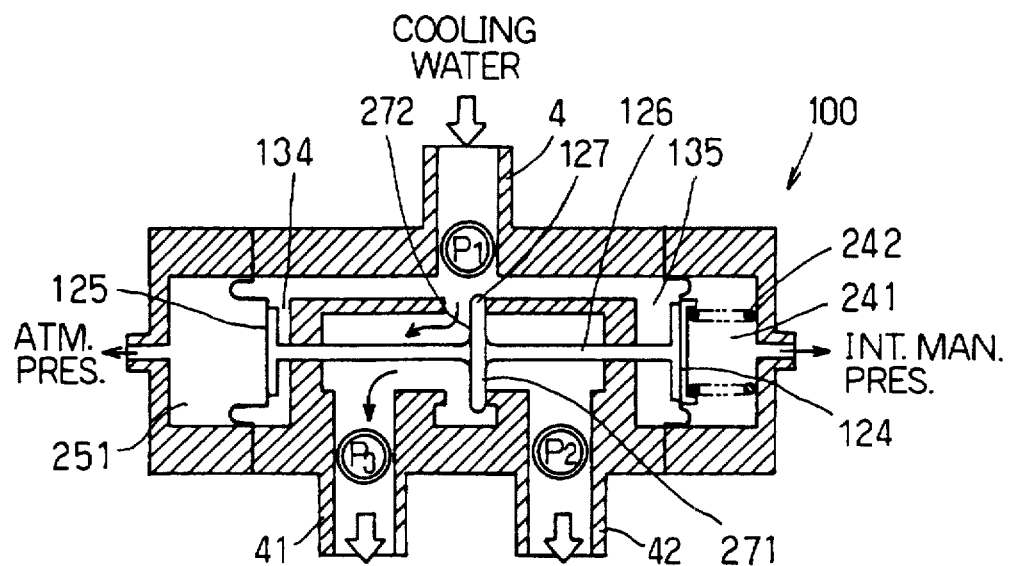
FIG. 4 shows the adjusting valve according to the first embodiment.

FIG. 4 shows an adjusting valve 100 according to a second embodiment of the present invention.

In the adjusting valve 100, diaphragms 124 and 125 are connected to respective ends of the shaft 126. The valve body 127 is in the middle of the shaft 126. A diaphragm chamber 241 of the diaphragm 124 communicates with the intake manifold, and the negative pressure of the intake manifold acts on the diaphragm 124. A spring 242 biasing the diaphragm 124 toward the diaphragm 125 is disposed in the diaphragm chamber 241. A diaphragm chamber 251 of the diaphragm 125 communicates with the atmosphere.

When the negative pressure of the intake manifold is large and the sucking force from the negative pressure acting on the diaphragm 124 is greater than the pressing force of the spring 242, the valve body 127 is pulled toward the diaphragm chamber 241 together with the diaphragm 124. As a result, fluid flowing from the main bypass passage 4 flows in the first bypass passage 41.

On the other hand, when the negative pressure of the intake manifold is small, the valve body 127 moves to close the first bypass passage 41. Therefore, the fluid flowing from the main bypass passage 4 flows in the second bypass passage 42.

The fluid flowing from the main bypass passage 4 flows in diaphragm adjoining chambers 134 and 135 facing the diaphragms 125 and 124, respectively. Therefore, pressing force of fluid pressure operated on the diaphragm 124 is canceled by pressing force of fluid pressure operated on the diaphragm 125 and movement of the valve body 127 by a diaphragm actuator can be controlled merely by the negative pressure of the intake manifold.

In the adjusting valve 100 shown in FIG. 4, when the fluid flowing from the main bypass passage 4 flows in the second bypass passage 42, the fluid pressure in the main bypass passage 4 is equal to the fluid pressure in the second bypass passage 42, thus producing a pressure differential between the fluid pressure in the main bypass passage 4 and the fluid pressure in the first bypass passage 41. When the fluid flowing from the main bypass passage 4 flows in the first bypass passage 41, the fluid pressure in the main bypass passage 4 is equal to the fluid pressure in the first bypass passage 41, thereby producing a pressure differential between the fluid pressure in the main bypass passage 4 and the fluid pressure in the second bypass passage 42.

Figure 5:
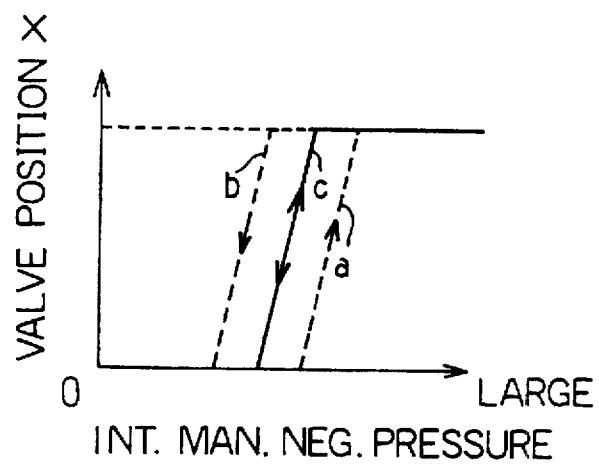
FIG. 5 is a graph showing the relationship between intake manifold negative pressure and valve positions in the first embodiment.
Figure 6:
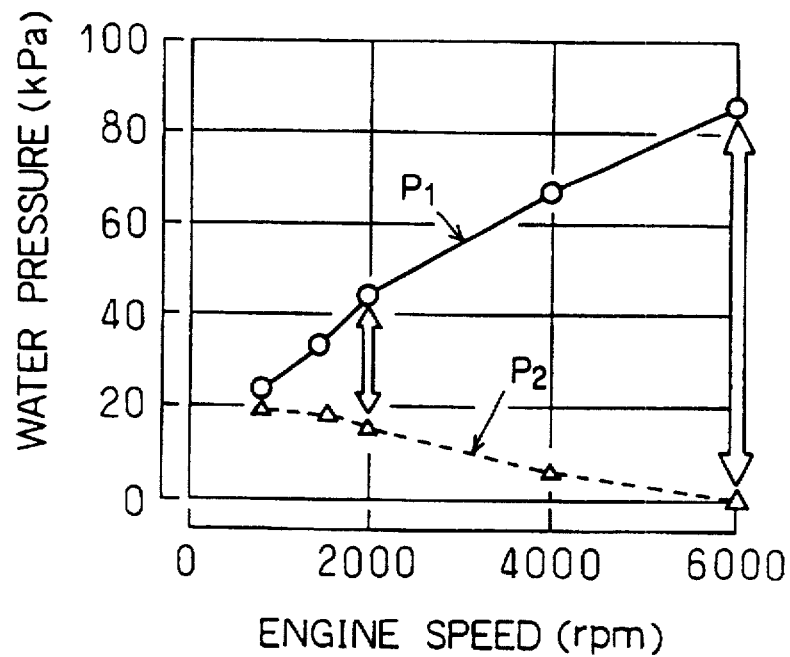
FIG. 6 is a graph showing the relationship between engine rotational speed and water pressure in the first embodiment.

In any case, since the force acts on the valve body as shown with dotted lines "a" and "b" in FIG. 5, there is a small amount of hysteresis in the movement of valve body 127. The higher the engine rotational speed, the greater the magnitude of the hysteresis. For example, as shown in FIG. 4, when the negative pressure of the intake manifold is large enough, the valve body 127 is attracted toward the diaphragm chamber 241, thereby regulating the total amount of fluid flowing in the first bypass passage 41 from the main bypass passage 4. At this time, water pressure $P_1$ (in main bypass passage 4) and water pressure $P_3$ (in first bypass passage 41) are nearly equal; however, water pressure $P_2$ (in second bypass passage 42) becomes lower than the water pressure $P_1$ since fluid does not flow in the second bypass passage 42. Therefore, the valve body pressing force of $(P_1-P_2) \times S_B$ (in which $S_B$ is an area of the valve body 127) acts on the valve body 127. As shown in FIG. 6, the higher the engine rotational speed, the more the differential pressure $(P_1-P_2)$ increases with respect to the engine rotational speed. Thus, the pressing force by the valve body 127 becomes greater in accordance with the engine rotational speed.

When the negative pressure of the intake manifold falls from the state shown in FIG. 5, the characteristic curve shifts toward the left of line "c" as shown by line "b". The amount of the shift becomes greater in accordance with the engine rotational speed. The line "c" denotes the characteristic curve when the valve body pressing force does not exist and there is no hysteresis in the movement of the valve body 127.

When the negative pressure in the intake manifold is sufficiently small and the valve body 127 is at its leftmost position, the water pressure $P_1$ is equal to the water pressure $P_2$. However, since the water pressure P3 is lower than the water pressure P1, a valve body pressing force of $(P_1-P_3) \times S_B$ acts thereon. When the negative pressure of the intake manifold falls from this state, the characteristic curve shifts toward the right of line "c" as shown in FIG. 5, and the magnitude of the shift becomes larger with an increase in the engine rotational speed.

Figure 7A:
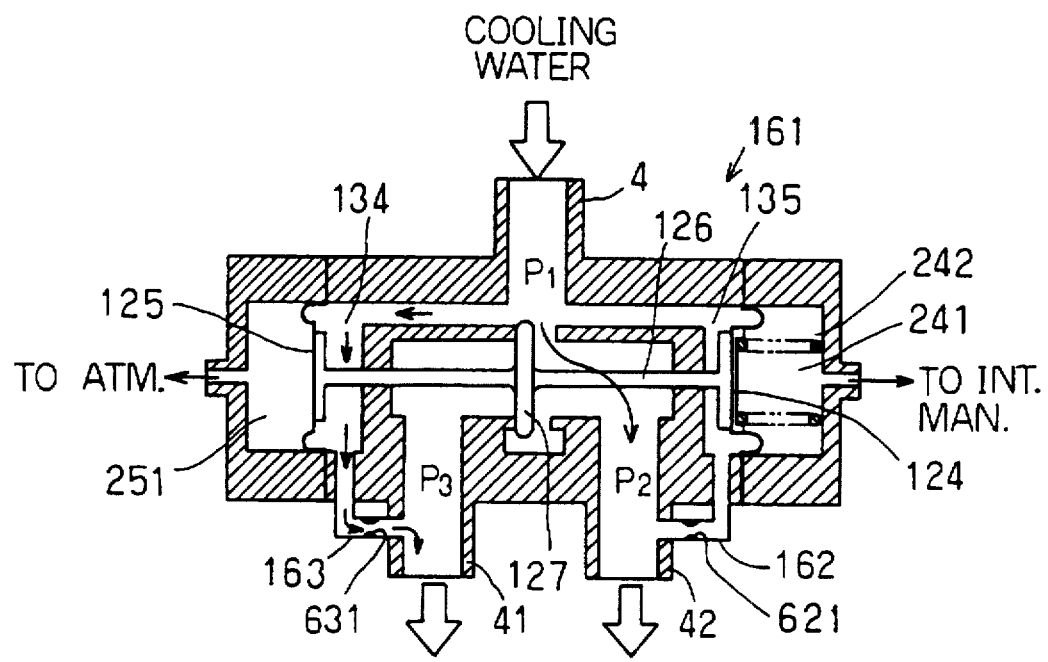
FIGS. 7A and 7B are cross-sectional views showing main portions of an adjusting valve according to a second embodiment of the present invention.
Figure 7B:
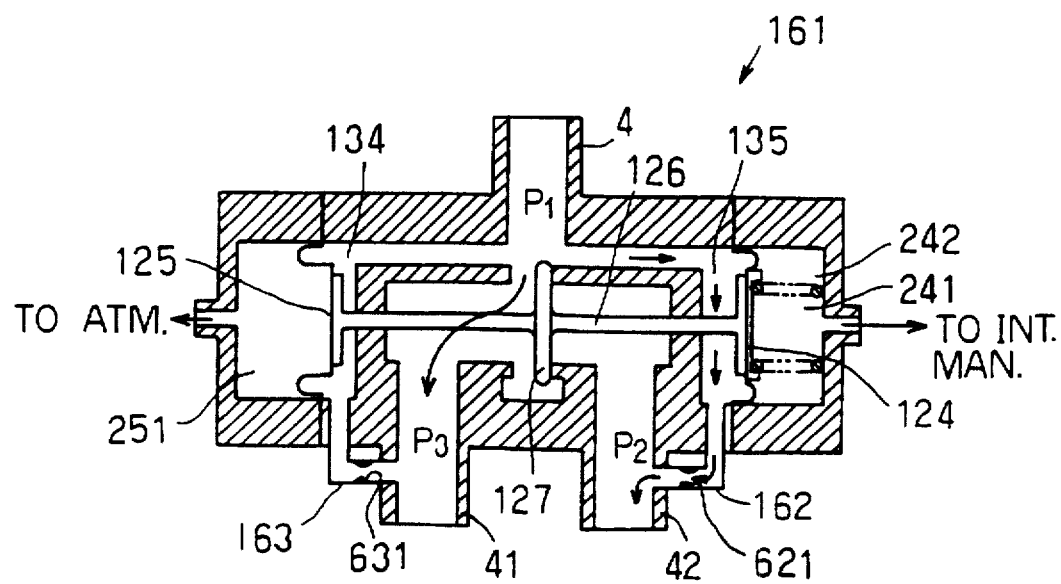

In a third embodiment of the present invention, it is possible to provide an adjusting valve in which the amount of flow is accurately adjusted by a desired pressure by reducing the fluid pressure on the valve body 127. FIGS. 7A and 7B show an adjusting valve 161 incorporating this feature.

The structure of the valve shown in FIGS. 7A and 7B is generally the same as the structure of the valve shown in FIG. 4, and only the differences therebetween are explained below.

In the adjusting valve 161 shown in FIGS. 7A and 7B, water pressure reducing port 62 is a fluid passage in which the diaphragm adjoining chamber 135 communicates with the second bypass passage 42. Water pressure reducing port 163 is a passage in which the diaphragm adjoining chamber 134 communicates with the first bypass passage 41. Restrictions 621 and 631 are provided on the water pressure reducing ports 162 and 163. The valve body 127 is an adjusting valve. Further, in the adjusting valve 161, the valve body pressing force can be canceled via the restrictions 621 and 631.

Figure 8:
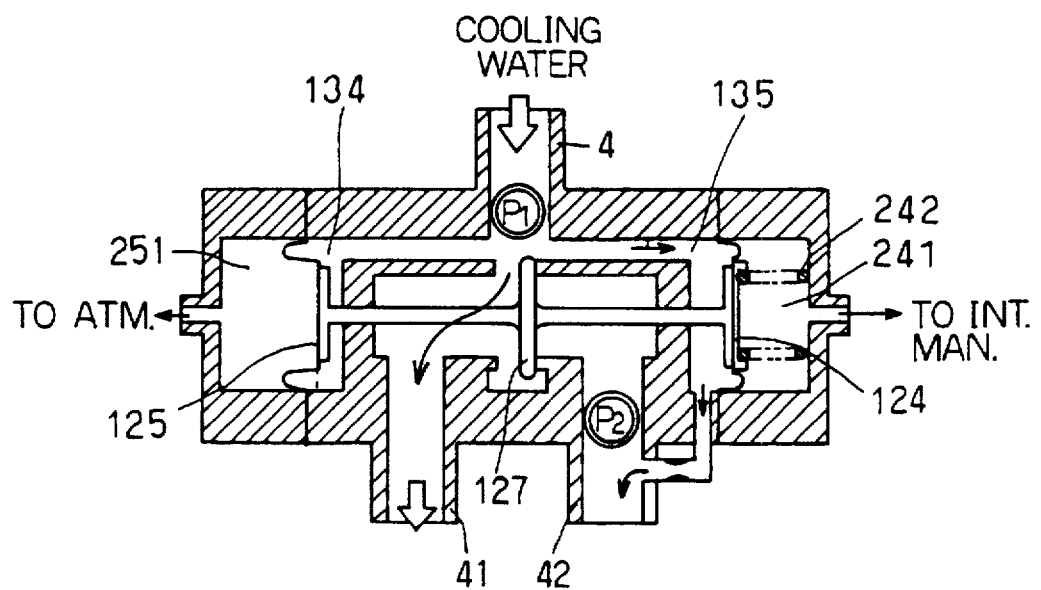
FIG. 8 shows the adjusting valve.

As shown in FIG. 8, the water pressure reducing port 162 is provided only at the diaphragm chamber 135. The valve body pressing force is canceled when the valve body is in the state shown in FIG. 4 and the line "b" in FIG. 5 can coincide with the line "c" without depending on the engine rotational speed. That is, by providing the water pressure reducing port 162 at the diaphragm chamber 135, a small amount of flow "q" with respect to a root of the difference $(P_1-P_2)$ between the water pressure $P_1$ and the water pressure $P_2$ flows in the diaphragm adjoining chamber 135. The pressure inside the diaphragm adjoining chamber 135 is reduced by $\Delta P$ compared with the pressure inside the diaphragm adjoining chamber 134. A valve body returning force of $\Delta P \times S_D$ (in which $S_D$ is an area of the diaphragm) acts on the valve body pressing force $(P_1-P_2) \times S_B$ to oppose the valve body force. The pressure reduction $\Delta P$ is proportional to the square of the small amount of flow "q". When the restriction diameter is set to $\phi d$, "q" is proportional to $d_2 \times (P_1-P_2)^{1/2}$ and $(P_1-P_2)$ is proportional to the engine rotational speed Ne; therefore, the pressure reduction $\Delta P$ is $\Delta P \times Ne$. As a result, the valve body pressing force $(P_1-P_2) \times S_B$ is proportional to the valve body returning force $\Delta P \times S_D$.

Therefore, the restriction diameter $\phi d$ is set so that the valve body pressing force is equal to the valve body returning force; therefore, the valve body pressing force can be canceled and the line "b" will coincide with the line "c" without depending on the engine rotational speed.

In the present embodiment, not only can line "b" coincide with line "c", but also line "b" can move toward the right in FIG. 5. The amount of shift of line "b" toward the right can be set as desired. For example, line "b" moves to the right more than line "c", and at high rotational speed and when the negative pressure of the intake manifold is greater than the line "c", the valve will move.

In order to move line "a" in FIG. 5 to the left in FIG. 5, the same water pressure reducing port is provided on a side of the diaphragm adjoining chamber 134 so that amount by which line "a" moves toward the left can be set as desired.

FIG. 7A shows a situation where the negative pressure of the intake manifold is small enough and the valve body 127 is at a leftmost position. Since a most of the fluid flows from the main bypass passage 4 to the second bypass passage 42, the water pressure $P_1$ is nearly equal to the water pressure $P_2$ and little water flows in the water pressure reducing port 162. Thus, the water pressure inside the diaphragm adjoining chamber 135 becomes approximately the same as the water pressure $P_1$. Therefore, a little flowing amount $q_A$ being proportional to $d_A^2 (P_1-P_3)^{1/2}$ flows in the water pressure reducing port 163, and therefore, the water pressure in the diaphragm adjoining chamber 134 is reduced by $\Delta P_A$ compared to the water pressure in the diaphragm adjoining chamber 135. The valve body returning force of $\Delta P_A \times S_D$ acts to the right to oppose the valve body pressing force $(P_1-P_3) \times S_B$, and therefore, the line "a" moves toward the left in FIG. 5.

Similarly, when the negative pressure of the intake manifold is large enough and the valve body 127 is at the position shown in FIG. 7B, in contrast with the case shown in FIG. 7A, fluid does not flow in the water pressure reducing portion 163, and a small amount of flow $q_B$ which is proportional to $d_B{}^2 (P_1-P_2)^{1/2}$ flows in the water pressure reducing portion 162. Thus, the water pressure in the diaphragm adjoining chamber 135 is reduced by $\Delta P_B$ compared with the water pressure in the diaphragm adjoining chamber 134. The valve body returning force $\Delta P_B \times S_D$ acts to the left and opposes the valve body pressing force $(P_1-P_2) \times S_B$. Therefore, the line "b" in FIG. 5 moves to the right in FIG. 5.

Thus, by selecting either the restriction diameter $\phi d_A$ or the restriction diameter $\phi d_B$, the line "c" can be set to a characteristic curves shown in FIG. 5 without hysteresis or to a specified characteristic curve with hysteresis.

Figure 9:
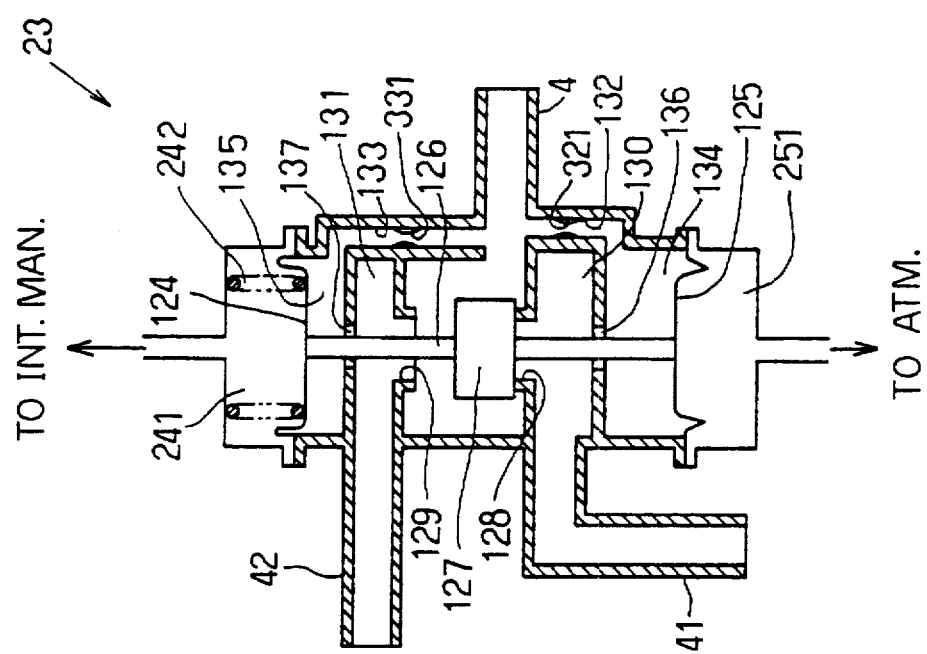
FIG. 9 is a cross-sectional view showing a main portion of an adjusting valve according to a third embodiment of the present invention.

Next, an adjusting valve according to a fourth embodiment of the present invention is explained with reference to FIG. 9. For the same structure as in FIGS. 4, 7A and 7B, the same reference numbers are used.

In the fourth embodiment, instead of providing the water pressure reducing port 162, a space 137 communicating with the diaphragm adjoining chamber 135 and the second bypass passage 42 is formed around the shaft 126, and a space 136 communicating with the diaphragm 134 and the first bypass passage 41 is formed around the shaft 126.

Since restrictions 321 and 331 are provided at restriction passages 132 and 133 connecting the main bypass passage 4 with the diaphragm adjoining chambers 134 and 135, as described in the third embodiment, an adjusting valve having a desired response characteristic with respect to pressure can be obtained by adjusting the diameters of the restrictions 321 and 331.

Figure 10:
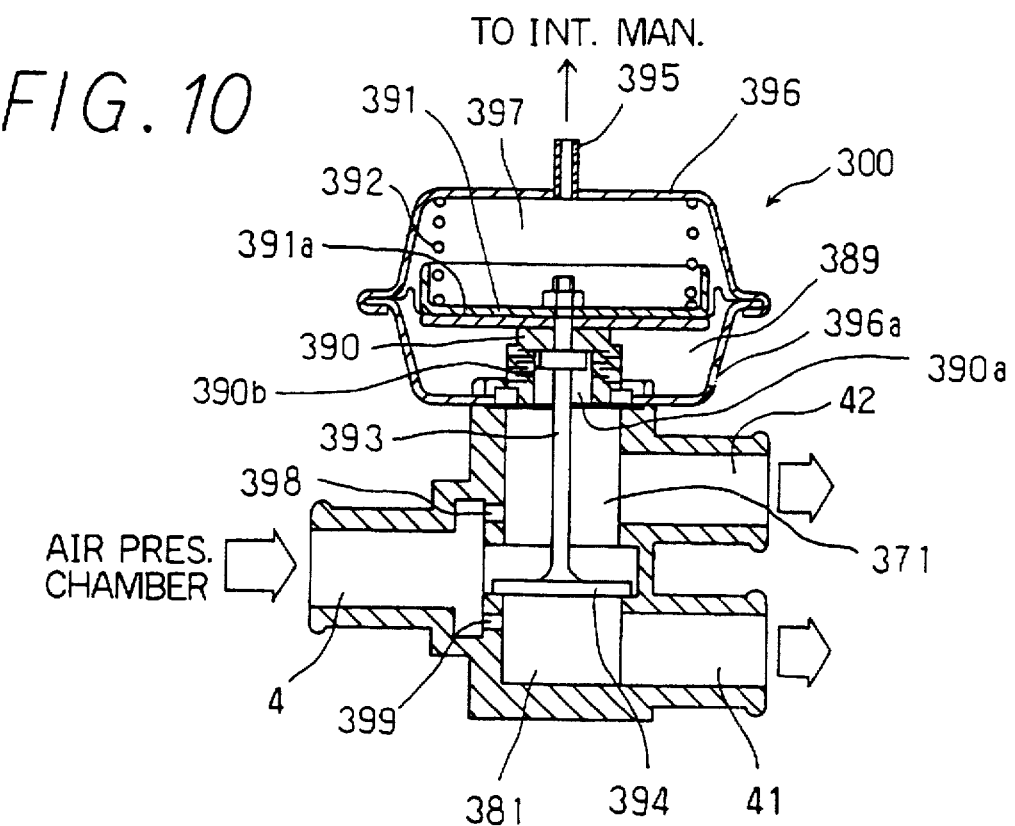
FIG. 10 is a cross-sectional view showing an adjusting valve according to a fourth embodiment of the present invention.

Next, an adjusting valve according to a fifth embodiment of the present invention is explained with reference to FIG. 10.

Adjusting valve 300 is near the point where the main bypass passage 4 communicates with the first bypass passage 41 and the second bypass passage 42 from which the fluid flows out. In the adjusting valve 300, diaphragm chamber 397 is in a space in the upper part of casing 396 above the diaphragm 391. A spring 392 biasing the diaphragm 391 in a downward direction is in the diaphragm chamber 397. Further, an opening hole 396a allows air pressure chamber 389 below the diaphragm 391 to open to air pressure outside the casing 396. A shaft 393 having a valve body 394 at an end of the shaft 393 for controlling the fluid passage flow extends downward from the diaphragm 391. The valve body 394 moves up and down together with up and down movement of the diaphragm 391. The valve body 394 opens and closes to switch communication between the main bypass passage 4 in which the fluid flows alternately between the first bypass passage 41 and the second bypass passage 42.

The diaphragm chamber 397 communicates with the intake manifold via a conducting pipe 395, and the negative pressure of the intake manifold is supplied to the diaphragm chamber 397. A bellows 390, made of Teflon® resin, which is vertically expandable is provided below the center of the diaphragm 391, and a top end portion of the bellows 390 is fixed to the diaphragm 391 and the other end portion is fixed on an internal surface of the casing 396 below the air pressure chamber 389. Therefore, the bellows 390 expands and contracts due to the up-and-down movement of the diaphragm 391. The bellows 390 isolates an internal space 390a of the bellows 390 and the air pressure chamber. The internal space 390a of the bellows 390 communicates with a communicating hole 371 connecting the main bypass passage 4 to the second bypass passage 42 below the internal space 390a. Although the fluid flowing in the communicating hole 371 flows in the internal space 390a, the fluid flowing in the internal space 390a is shut by the bellows 390 and does not flow in the air pressure chamber 389.

Next, operation of the adjusting valve 300 is explained.

The position of the diaphragm 391 is changed by changing the pressure balance on the sides of the diaphragm 391 due to a change in the negative pressure of the intake manifold. Responsive to the change in position, the valve body 394 connected to the diaphragm 391 moves. That is, when the negative pressure of the intake manifold becomes large, the diaphragm 391 overcomes an upward biasing force of the spring 392 and moves upward; consequently, the valve body 394 is drawn upward. The main bypass passage 4 communicates with the first bypass passage 41 through a communicating hole 381 and the communication between the main bypass passage 4, and the second bypass passage 42 is shut off. When the negative pressure of the intake manifold becomes small, the diaphragm 391 is pressed downward by the biasing force of the spring 392, and the valve body 394 is in a state shown in FIG. 10. The main bypass passage 4 communicates with the second bypass passage 42 through the communicating hole 371, and the communication between the main bypass passage 4 and the first bypass passage 41 is shut off. Thus, the diaphragm 391 moves up and down due to the negative pressure of the intake manifold, the valve body 394 connected to the diaphragm 391 moves and the fluid passages are switched.

When the fluid flows through the communicating hole 371, the fluid flows in the internal space 390a of the bellows 390. Therefore, although pressure of the fluid acts on a top end surface 390b on the internal space 390a of the bellows 390, since an area of the top end surface 390b on which the fluid acts is smaller than an area 391a of the diaphragm 391 on which the negative pressure of the intake manifold acts, an effect of the diaphragm 391 due to the fluid can be minimized. Therefore, although pressure change of the fluid at the communicating hole 371 is produced by opening and closing the valve body 394, the diaphragm 391 is not affected directly and opening and closing of the valve body 394 can be switched by the negative pressure of the intake manifold.

Figure 11:
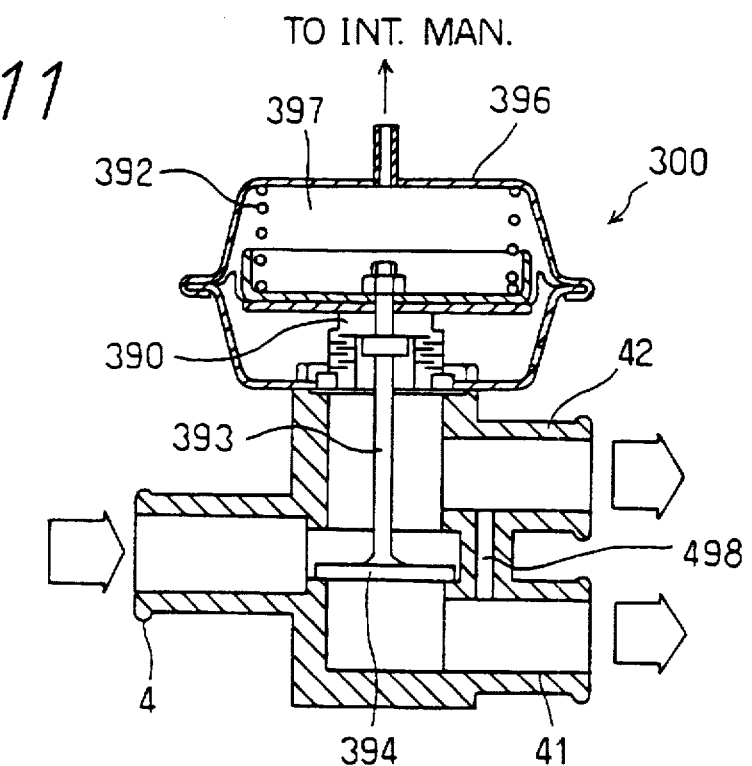
FIG. 11 is a cross-sectional view showing an adjusting valve according to a fifth embodiment of the present invention.

Further, in order to minimize the effect of the pressing force on the valve body 394 due to a fluid pressure difference operating vertically on the valve body 394, a small diameter communicating port 398 connecting the main bypass passage 4 with the communicating hole 371 and a small diameter communicating port 399 connecting the main bypass passage 4 and the communicating hole 381 are provided and as in the other embodiments, the hysteresis characteristic of the valve position with respect to the negative pressure of the intake manifold can be moderated by reducing the pressure difference in the vertical direction of the valve body 394. As shown in FIG. 11, instead of providing the communicating ports 398 and 399, a communicating port 498 communicating between the first bypass passage 41 and the second bypass passage 42 can be provided to obtain the same effect.

Figure 12:
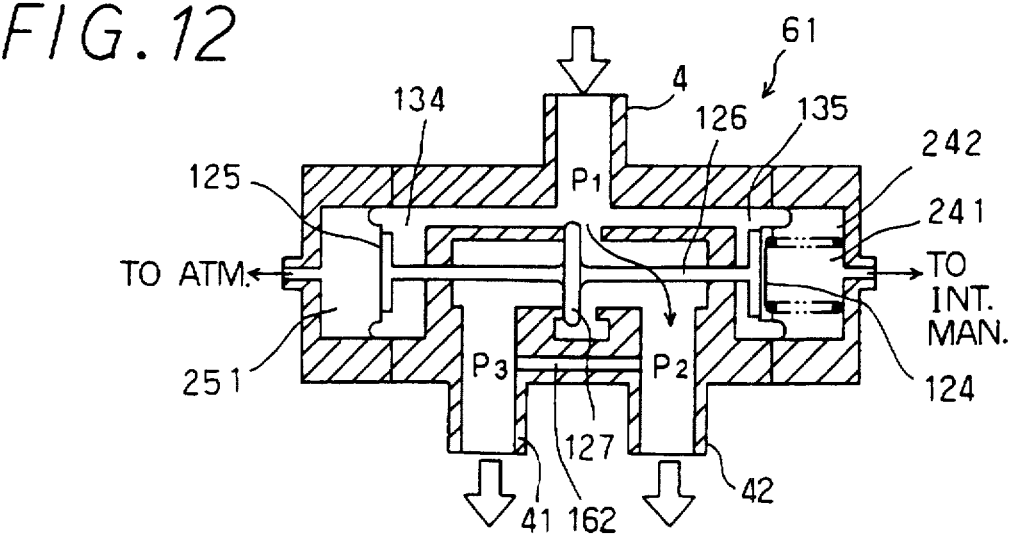
FIG. 12 is a cross-sectional view showing an adjusting valve according to a sixth embodiment of the present invention.

In the structure in FIG. 4, as shown in FIG. 12, a communicating port 162 having a small diameter and communicating between the first bypass passage 41 and the second bypass passage 42 can be provided so that like in FIG. 11, the pressure difference between the right and left sides of the valve body 127 is reduced and the hysteresis of the valve position with respect to the negative pressure of the intake manifold can be minimized.

Figure 13:
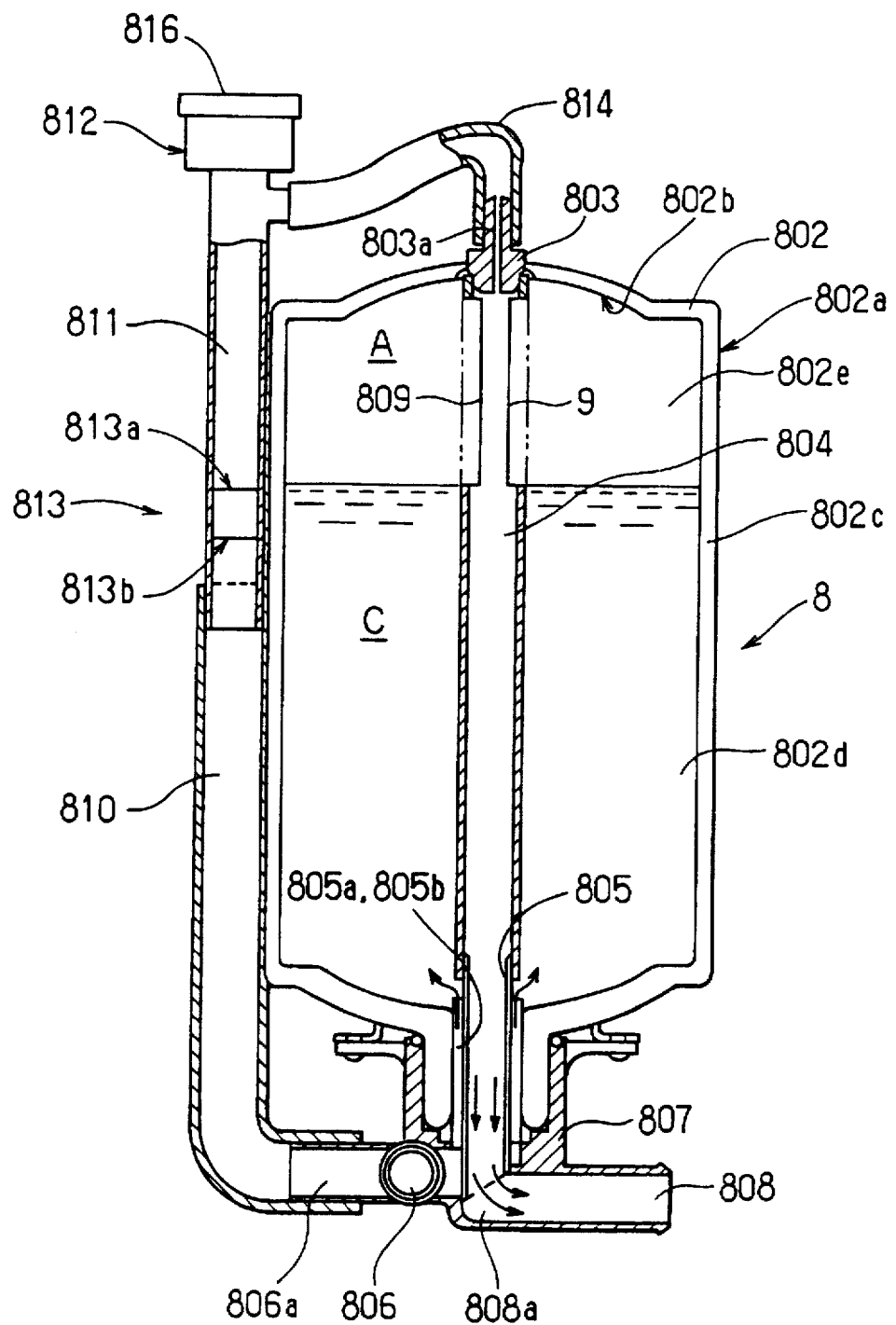
FIG. 13 is a cross-sectional view showing a heat accumulating-type reserve tank used in the cooling system of an internal combustion engine according to the present invention.

FIG. 13 shows the heat accumulator 8. The heat accumulator 8 functions as a heat accumulating tank for reserving high-temperature cooling water in a heat-retaining state and as a reserve tank for the cooling water. Most portions of a tank body 802 are formed by a double wall composed of an external wall 802a and an internal wall 802b formed by drawing a stainless steel thin plate. A vacuum is created in a space 802c between the external wall 802a and the internal wall by evaluating the air therein. A metallic exhaust stopcock 803 is for discharging the air from the space 802c. After evacuating air from the space 802c, the metallic exhaust stopcock 803 engages openings of the external wall 802a and the internal wall 802b and is fixed thereto by a method such as welding. Therefore, the space 802c is shut off by the exhaust stopcock 803 and the exhaust stopcock 803 functions as a spacer for preserving a specified clearance between the external wall 802a and the internal wall 802b. An air releasing hole 803a penetrating a center of the exhaust stopcock 803 is a passage for releasing the air when the water is poured into the tank body 802.

A strut 804 made of a hollow metallic pipe (for example, stainless steel) is supported vertically at a center of the tank body 802. A top end of the strut 804 is connected to the exhaust stopcock 803 and engages with a bottom end of the exhaust stopcock 803, and a bottom end of the strut 804 is connected to a top end of the thin metallic pipe 805 supported at the bottom portion of the tank body 802 by a method such as welding. A spacer portion 805a having a plurality of spline-shaped threads protruding in the vertical direction is provided integrally or separately around the metallic pipe 805. Inside a relatively large opening formed at the bottom portion of the internal wall 802b of the tank body 802 there is a cooling water entering passage 805b connecting between an internal space 802d of the tank body 802 and an inlet 806.

The opening of the bottom portion of the tank body 802 is closed by a block 807 installed on the tank body 802 by sealing. A cooling water outlet 808 partitioned with respect to a side of the inlet 806 by the metallic pipe 805 is formed on the block 807 at a position other than at the inlet 806. The outlet 808 forms an outlet passage 808a by communicating with each internal space of the metallic pipe 805 and the strut 804. The outlet passage 808a communicates with the internal space 802d of the tank body 802 through a water gathering port 809 formed by cutting the top portion of the strut 804. The spacer portion 805a for forming the inlet passage 805b can be formed, for example, by winding a metallic plate in a vertical cylindrical shape around the metallic pipe 805.

A short pipe 806a communicating with the inlet 806 of the block 807 is vertically connected to a bottom end of a transparent plastic pipe 811, and the plastic pipe 811 is supported by a stay (not shown) through a hard rubber pipe 810 extending upward. The short pipe 806a is connected to a water pouring portion 812 provided integrally with and passing through the plastic pipe 811. The plastic pipe 811 is for forming a water level checking portion 813 and, for example, a scale line 813a showing an upper limit of the water level and a scale line 813b showing a lower limit are impressed thereon. A diverging portion 811a formed at the top portion of the plastic pipe 811 is connected to the exhaust stopcock 803 by a hard rubber pipe 814. Therefore, the internal space 802d of the tank body 802 communicates with a top portion space inside the plastic pipe 811 through the water gathering port 809 of the strut 804 inside the tank body 802 and the air releasing hole 803a of the exhaust stopcock 803.

Figure 14:
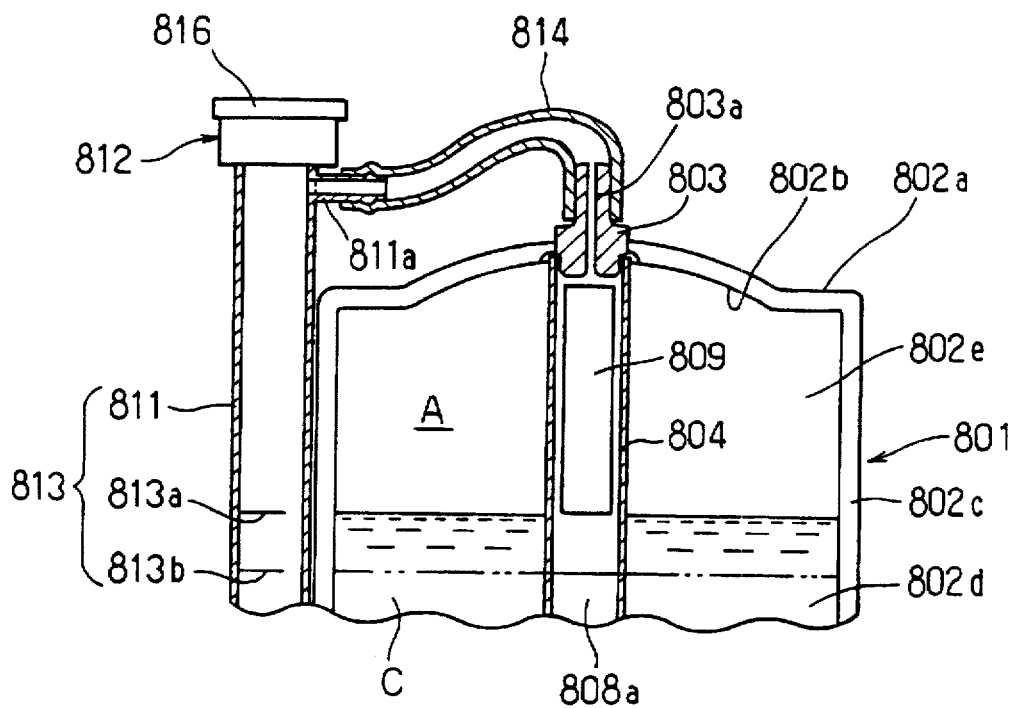
FIG. 14 is an enlarged cross-sectional view showing a portion of the reserve tank of FIG. 13.
Figure 15:
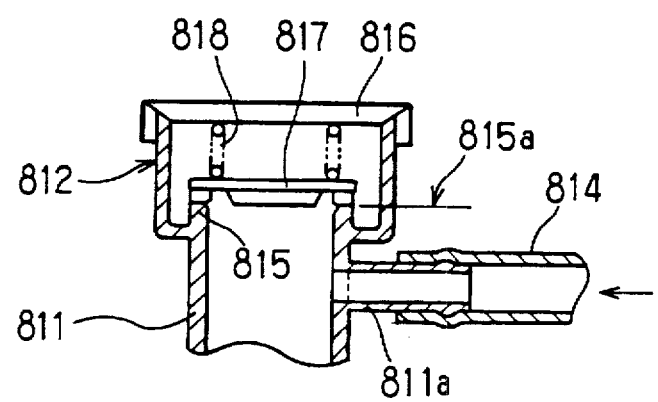
FIG. 15 is an enlarged cross-sectional view showing a portion of the reserve tank of FIG. 14.

FIG. 14 shows the detailed structure around the water pouring portion 812 including the top portion of the tank body 802. FIG. 15 shows an enlarged internal structure of the water pouring portion 812. A top end of the plastic pipe 811 communicating with the inlet 806 of the block 807 opens to an internal space of the glass-shaped water pouring portion 812 and an opening end portion of the plastic pipe 811 forms a circular valve seat 815. A cam is detachably provided on a supplying water cap 816 so that the opening of the top portion of the water pouring portion 812 is closed. A spring 818 whose top end is provided at the cap 816 biases a disk-shaped valve body 817 and is pressed by the valve seat 815 with a specified force in such a manner that the opening of the valve seat 815 is closed. A height of the diverging portion 811a of the plastic pipe 811 communicating with the air releasing hole 803a of the exhaust stopcock 803 is positioned below a seal surface 815a of the valve seat 815.

Thus, in the heat accumulator 8 as described above, due to the thermal insulating operation of a vacuum space 802c between the external wall 802a and the internal wall 802b and by forming the inlet 806 and the outlet 808 at a bottom portion of the tank body 802, external heat emission is minimized. Therefore, after stopping the engine, warm water can be preserved in the heat accumulator 8 for a relatively long time. Thus, the preserved warm water is used as an effective heat source the next time the engine is started.

The heat accumulator 8 not only automatically maintains warm water but also automatically adjusts the amount of cooling water used and accumulates the cooling water. When the engine 1 is manufactured and the cooling water is first filled and the cooling water is supplemented after being used for a long time, the cap 816 of the water pouring portion 812 of the heat accumulator 8 and the spring 818 accompanying the cap 816 and the valve body 817 are removed and new cooling water (generally speaking, coolant) is poured in the plastic pipe 811 of the water level checking portion 813 from the valve seat 815. When a space exists in the cooling water passage of the side of the engine 1 because the cooling water passage is not totally filled with the cooling water, the supplied cooling water passes through the inlet 806 from the short pipe 806a and is supplied to the engine 1 through the radiator 2, the cooling water passage 3 and fills a space in the cooling water passage.

When the cooling water passage in the engine 1 is filled with the cooling water, the cooling water supplied afterwards is filled in order from a bottom portion of the internal space 802d of the tank body 802 through the inlet passage 805b inside the tank body 802 from the inlet 806. At that time, the air in the space 802d passes through the air releasing hole 803a of the exhaust stopcock 803 and escapes to the atmosphere through the opening of the valve seat 815 opening from the diverging portion 811a and an air layer "A" is replaced with a cooling water layer "C" gradually from a bottom portion of the air layer "A". Therefore, pouring water in the heat accumulator 8 can be carried out smoothly. The cooling water entering the heat accumulator 8 enters an internal portion of the strut 804 from the water gathering port 809 and the outlet passage 808a positioning from the internal portion of the strut 804 to the outlet passage 808a and the outlet pipe 827 are filled with the cooling water. Thus, when the cooling water spreads out in a portion being filled and the water level of the cooling water in the heat accumulator 8 exceeds a scale indicating a specified level such as a scale 813a indicating the upper limit of the cooling water level, the supply of the cooling water is stopped.

Thus, when the supply of the cooling water is stopped, a space 802e in which the air is accumulated at a top portion of the heat accumulator 8, that is, the air layer "A", having a specified dimension is formed. In that state, the cap 816 is installed at the water pouring portion 812 so that the cooling water passage is shut off by the valve body 817. When temperature of the cooling water rises due to operation of the engine 1 and the volume of the cooling water is expanded, the water level in the heat accumulator 8 rises and the air layer "A" is compressed and reduced. Therefore, the amount of the cooling water in the cooling water passage in the engine 1 can be maintained properly by elastic operation of the air. This is an automatic amount adjusting function of the cooling water.

Thus, when the water level in the heat accumulator 8 is raised, the air accumulated in the space 802e, that is, the air layer "A", is compressed. The cooling water staying in the cooling water passage has a higher pressure than the air pressure, and therefore, the cooling water is prevented from boiling and stable engine cooling is carried out. In an abnormal state such as engine overheating in which the pressure becomes extremely high, the valve body 817 of the water pouring portion 812 opens the entrance of the valve seat 815 opposing the spring 818 and the high pressure is released to the atmosphere. Thus, the cooling water passage can maintain proper pressure.

Figure 16:
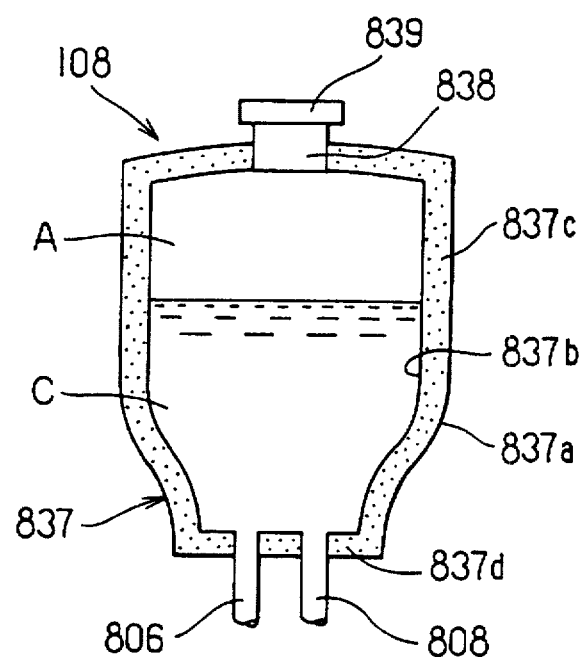
FIG. 16 is a cross-sectional view showing a heat accumulating-type reserve tank used in the cooling system of an internal combustion engine according to a seventh embodiment of the present invention.
Figure 17:
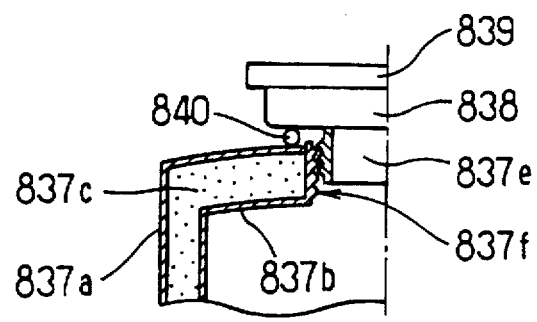
FIG. 17 is an enlarged cross-sectional view showing a portion of the reserve tank of FIG. 16.

FIGS. 16 and 17 show a simplified heat accumulator. A tank body 837 of the heat accumulator 108 includes an outer wall 837a and an inner wall 837b made of metal or plastic and a heat insulating layer 837c made of blister-filled plastic and blistered between the outer wall 837a and the inner wall 837b to bond the outer wall 837a with the inner wall 837b. Similar to the heat accumulator 108, in this case, to minimize heat emission, the inlet 806 and the outlet 808 for the cooling water are provided at a bottom wall portion 837d.

As shown in the enlargement of FIG. 17, a tip wall portion 837e of the tank body 837 has an opening 837f provided with a fixing part such as a male-threaded interior diameter. A plastic water pouring inlet 838 is fixed at the opening 837f. A cap 839 for supplying water is detachably installed on the water pouring inlet 838 by a part such as a threaded interior diameter or a cam. An O-ring 840 is for sealing. A cooling water layer "C" is formed at a bottom portion of the heat accumulator 108 and the air layer "A" is formed at a top portion of the heat accumulator 108.

FIGS. 18A and 18B show a structure of the heat accumulator 108 in which a portion thereof is improved. Basically, since the tank in the improved heat accumulator 108 has the same structure as in the previously-described version tank, the same reference numbers are used for the same structure. The heat accumulator 108 has a water level checking portion 842. The water level checking 842 has a slender opening window shown in FIG. 18B at a side wall portion of the tank 837 and a window of transparent or translucent plastic 843 is fitted in the opening.

A surface of the cooling water layer "C" in the heat accumulator 108 can be detected easily through the plastic 843 of the water level checking portion 842. The scale 813a indicating the upper limit and the scale 813b indicating the lower limit which are the same scales provided on the water level checking portion 813 in FIG. 14 can be provided on the plastic 843.

A surface of the cooling water layer "C" inside the heat accumulator 108 can be detected easily through the plastic 843 of the water level checking portion 842. The scale 813a indicating the upper limit and the scale 813b indicating the lower limit, which are the same as the scales provided on the water level checking portion 813, can be provided on the plastic window 843.

FIG. 19 shows a spherical heat accumulator 208 having high pressure resistance. A tank body 845 of the heat accumulator 208 includes a double-wall structure containing a vacuum as in other embodiments, a spherical heat insulating wall 845a having plastic blisters and a spherical container 846 made of translucent plastic provided as a lining. The inlet 806 and the outlet 808 at the bottom portion and the water pouring portion 838 at the top portion are provided at the spherical container 846 by penetrating the heat insulating wall 845a. Although the water level checking portion 842 is provided, the plastic 843 as a transparent window is disposed at an opening of the heat insulating wall 845a. A basic operation and effect of the heat accumulator 208 is the same as the heat accumulator 208 in the other embodiments.

The present invention having been described should not be limited to the disclosed embodiments, but it may be modified in many other ways without departing from the scope and the spirit of the invention. Such changes and modifications are to be understood as being included with the scope of the present invention as defined by the appended claims.

What is claimed is:

1. A cooling system for an internal combustion engine, said system comprising:

a first cooling water passage for conveying cooling water flowing from a cooling water outlet of said internal combustion engine to an inlet of a radiator and a second cooling water passage for conveying cooling water from an outlet of said radiator to a cooling water inlet of said internal combustion engine;

a bypass passage for returning said cooling water just after flowing from said cooling water outlet of said internal combustion engine to said cooling water inlet of said internal combustion engine without passing through said radiator;

load state detecting means for detecting a load state of said internal combustion engine;

a valve for opening said bypass passage corresponding to a reduction of load of said internal combustion engine detected by said load state detecting means; and a heat accumulator connected to said bypass passage.

2. A cooling system for an internal combustion engine according to claim 1, wherein said load state detecting means includes a pressure chamber connected to an intake manifold of said internal combustion engine via a manifold passage, said pressure chamber being for driving a valve body operating diaphragm of said valve by introducing negative pressure of said intake manifold.

3. A cooling system for an internal combustion engine according to claim 1, wherein said heat accumulator comprises:

a wall having a heat insulating structure covering a whole outer surface, an interior surface of said wall defining a shut space capable of accumulating high-temperature cooling water and maintaining said temperature inside said wall;

cooling water forming a layer at a bottom portion of said space to automatically adjust increasing and decreasing amounts of cooling water flowing in said internal combustion engine;

shut air forming a layer at a top portion of said space, said shut air being compressed by said layer of cooling water;

an inlet for flowing said high-temperature cooling water into said space by passing through a part of said wall; and an outlet for flowing said high-temperature cooling water from an inside of said space by passing through said part of said wall.

4. A cooling system for an internal combustion engine according to claim 3, wherein said wall includes a transparent portion for detecting a level of a water surface of said layer of cooling water externally from said accumulator.

5. A cooling system for an internal combustion engine according to claim 3, wherein said wall has at least a double-wall structure and a space inside said structure is a vacuum.

6. A cooling system for an internal combustion engine according to claim 3, wherein said wall has at least a double-wall structure and a space inside said structure is filled with a heat insulating material.

7. A cooling system for an internal combustion engine according to claim 3, wherein said cooling water inlet and said cooling water outlet pass through a bottom portion of said wall of said structure.

8. A cooling system for an internal combustion engine according to claim 3, wherein a cap is provided at an opening for supplying said cooling water to said shut space so that said layer of shut air is shut off from atmosphere.

9. A cooling system for an internal combustion engine according to claim 1, further comprising:

a warm water supplying passage connected to said cooling water outlet of said internal combustion engine and to one of said first and second cooling water passages; and a heater core disposed in said warm water supplying passage.

10. A cooling system for an internal combustion engine according to claim 9, wherein said heat accumulator is connected to said warm water supplying passage.

11. A cooling system for an internal combustion engine said system comprising:

a first cooling water passage for returning cooling water flowing from a cooling water outlet of said internal combustion engine to a radiator and a second cooling water passage for conveying cooling water from said radiator to a cooling water inlet of said internal combustion engine;

a first bypass passage for returning said cooling water just after flowing from said cooling water outlet of said internal combustion engine to said cooling water inlet of said internal combustion engine without passing through said radiator;

a second bypass passage for returning said cooling water just after flowing from said cooling water outlet of said internal combustion engine to said cooling water inlet of said internal combustion engine through said second cooling water passage by supplying said cooling water in a vicinity of a heat sensing portion of a heat-sensing valve in said second cooling water passage, said heat-sensing valve opening responsive to a temperature of said cooling water;

load state detecting means for detecting a load state of said internal combustion engine;

a flowing ratio control valve for enlarging a flowing ratio of said cooling water to said first bypass passage with respect to said second bypass passage corresponding to a reduction of a load of said internal combustion engine; and a heat accumulator provided in said first bypass passage.

12. A cooling system for an internal combustion engine according to claim 11, wherein said load state detecting means includes a pressure chamber connected to an intake manifold of said internal combustion engine via a manifold passage, said pressure chamber being for driving a valve body operating diaphragm of said valve by introducing negative pressure of said intake manifold.

13. A cooling system for an internal combustion engine according to claim 11, wherein said heat accumulator comprises:

a wall having a heat insulating structure covering a whole outer surface, an interior surface of said wall defining a shut space capable of accumulating high-temperature cooling water and maintaining said temperature inside said wall;

cooling water forming a layer at a bottom portion of said space to automatically adjust increasing and decreasing amounts of cooling water flowing in said internal combustion engine;

shut air forming a layer at a top portion of said space and compressed by said layer of cooling water;

an inlet for flowing said high-temperature cooling water into said space by passing through a part of said wall; and an outlet for flowing said high-temperature cooling water from an inside of said space by passing through said part of said wall.

14. A cooling system for an internal combustion engine according to claim 13, wherein said wall includes a transparent portion for detecting a level of a water surface of said layer of cooling water externally from said accumulator.

15. A cooling system for an internal combustion engine according to claim 13, wherein said wall has at least a double-wall structure and a space inside said structure is a vacuum.

16. A cooling system for an internal combustion engine according to claim 13, wherein said wall has at least a double-wall structure and a space inside said structure is filled with a heat insulating material.

17. A cooling system for an internal combustion engine according to claim 13, wherein said cooling water inlet and said cooling water outlet pass through a bottom portion of said wall of said structure.

18. A cooling system for an internal combustion engine according to claim 13, wherein a cap is provided at an opening for supplying said cooling water to said shut space so that said layer of shut air is shut off from atmosphere.

19. A cooling system for an internal combustion engine according to claim 11, said flowing ratio control valve comprising:

a flow-in side passage in which cooling water flows;

a flow-out side passage from which said cooling water flowing from said flow-in side passage flows out;

an adjusting valve for adjusting a flowing amount of said cooling water flowing out to said flow-out side passage;

a first diaphragm connected to a first side of said adjusting valve and driving said adjusting valve due to a flowing amount adjusting pressure acting on a first surface and a fluid pressure acting on a second surface thereof; and a second diaphragm connected to a second side of said adjusting valve and driving said adjusting valve due to a second flowing adjusting pressure acting on a first surface thereof and a fluid pressure acting on a second surface thereof.

20. A cooling system for an internal combustion engine according to claim 19, wherein said ratio control valve further comprises:

a first communicating passage for connecting a volume proximate said second surface of said first diaphragm a portion of said flow-out side passage proximate said first side of said adjusting valve; and a second communicating passage connecting a volume proximate said second surface of said second diaphragm with a volume proximate said second side of said adjusting valve.

21. A cooling system for an internal combustion engine according to claim 19, wherein said flow-out side passage is disposed at each of said first and second sides of said adjusting valve and has first and second flow-out side passages in which flow of said cooling water is controlled by said adjusting valve, said flow-out side passage including a communicating passage having a small diameter connecting said first flow-out side passage with said second flow-out side passage.

22. A cooling system for an internal combustion engine according to claim 11, said flowing ratio control valve comprising:

a flow-in side passage in which cooling water flows;

a flow-out side passage from which said cooling water flows out;

an adjusting valve for adjusting a flowing amount of said cooling water flowing in from said flow-in side passage and flowing out to said flow-out side passage; and a diaphragm connected to a surface of said adjusting valve, said diaphragm for receiving a flowing amount adjusting pressure at a first side thereof and including a fluid pressure portion having a smaller area than said surface and receiving said fluid pressure at a second surface thereof and for driving said adjusting valve corresponding to said flowing amount adjusting pressure.

23. A cooling system for an internal combustion engine according to claim 22, wherein said flow-out side passage is disposed at each of said first and second sides of said adjusting valve and includes first and second flow-out side passages in which flow of said cooling water is controlled by said adjusting valve and each of said first and said second flow-out side passages has a communicating passage having a small diameter connecting its respective flow-out side passage to said flow-in side passage.

24. A cooling system for an internal combustion engine according to claim 22, wherein said flow-out side passage includes first and second flow-out side passages disposed at each of said first and second sides of said adjusting valve, said flow-out side passage including a communicating passage having a small diameter connecting said first flow-out side passage with said second flow-out side passage.

25. A cooling system for an internal combustion engine according to claim 11, further comprising:

a warm water supplying passage connected to said cooling water outlet of said internal combustion engine and to said first cooling water passage; and a heater core disposed in said warm water supplying passage.

26. A cooling system for an internal combustion engine according to claim 25, wherein said heat accumulator is connected to said warm water supplying passage.

* * * * *